United States Patent [19]

Campau

[11] Patent Number: 4,522,228

[45] Date of Patent: Jun. 11, 1985

[54] FLUIDIC LEVEL CONTROL SYSTEM

[76] Inventor: Daniel N. Campau, 656 Duxbury Ct., Grand Rapids, Mich. 49506

[21] Appl. No.: 620,071

[22] Filed: Jun. 12, 1984

[51] Int. Cl.[3] ........................ F15C 1/14; F16K 21/18

[52] U.S. Cl. .................................... 137/393; 137/842; 141/198

[58] Field of Search ............... 137/386, 393, 814, 815, 137/816, 817, 818, 842, 454, 453; 73/290 R; 141/198, 206, 209; 222/64

[56] References Cited

U.S. PATENT DOCUMENTS

| | | | |
|---|---|---|---|
| Re. 29,715 | 8/1975 | Richards | 141/226 |
| 3,561,465 | 2/1971 | de Graaf | 137/386 |
| 3,603,336 | 9/1971 | Fichter | 137/393 |
| 3,703,907 | 11/1972 | Richards | 137/386 |
| 4,202,367 | 5/1980 | Roth et al. | 137/393 |
| 4,211,249 | 7/1980 | Richards | 73/290 R |
| 4,296,996 | 10/1981 | Pataki et al. | 137/393 |
| 4,345,618 | 8/1982 | Altman et al. | 137/393 |
| 4,444,222 | 4/1984 | Yamagiwa | 137/393 |

FOREIGN PATENT DOCUMENTS

| | | | |
|---|---|---|---|
| 393112 | 6/1933 | United Kingdom | 137/393 |

*Primary Examiner*—George L. Walton
*Attorney, Agent, or Firm*—Niro, Scavone

[57] ABSTRACT

A liquid level control system for controlling the flow of liquid into a reservoir, storage tank or other container. A nozzle develops a liquid flow stream therethrough, and a valve effectively opens and closes the nozzle. A fluid amplifier is associated with the nozzle and includes a fluid power stream, a signal developing port for receiving a fluid pressure signal from the power stream, and a sensor for diverting the fluid power stream from the signal developing port in response to the static presence of the interface at a predetermined sensing level of liquid in the reservoir. A pressure responsive switch is coupled to the valve and is located below the signal developing port of the fluid amplifier. A pressure signal tube communicates between the signal developing port and the pressure responsive switch to create a hydrostatic pressure head above the switch to maintain the switch and, therefore, the valve in a first condition when the fluid power stream delivers a fluid pressure signal to the signal developing port. A second condition is developed when the fluid power stream is diverted from the signal developing port.

20 Claims, 3 Drawing Figures

FLUIDIC LEVEL CONTROL SYSTEM

BACKGROUND OF THE INVENTION

This invention relates generally to liquid level control devices and, in particular, to a fluidic level control system which may be utilized to control the flow of liquid into a reservoir, storage tank or other container and to control the level of liquid therein. The device of the present invention is particularly useful in an application where automatic shut-off features are desirable.

For instance, in U.S. Pat. No. 3,703,907, a fluid amplifier is disclosed having an inlet and an outlet zone and adapted for use in a liquid reservoir to sense a change of liquid level therein. The amplifier is adapted to be positioned adjacent the desired liquid sensing level in the reservoir and for directing a power stream substantially transversely to the surface of the liquid in the reservoir. Inlet means is constructed and arranged such that a fluid power jet is abruptly altered when the liquid level in the reservoir rises to a sensing level. This abrupt alteration develops a fluid pressure signal which may be used to control various apparatus, such as a pressure responsive fluid valve.

Such fluid amplifiers have been used in various applications. My copending patent application Ser. No. 491,521, filed May 4, 1983 discloses the use of fluid amplifiers in a filling device for use in connection with maintaining proper levels of electrolyte in individual cells of industrial batteries. My copending patent application Ser. No. 404,070, filed Aug. 2, 1982 shows the use of a fluid amplifier wherein the sensing level of liquid in a reservoir is at a remote point from the fluid amplifier itself. My copending patent application Serial No. 614,550 filed May 29, 1984 discloses a novel fluid amplifier using a "dual-jet" system. One jet is a major supply stream, and the other jet is a smaller fluid power stream which flows substantially parallel to the major supply stream. A signal developing device is provided for receiving a fluid pressure signal of one magnitude when the smaller power stream is generally parallel to the main supply stream and of a second magnitude when the smaller power stream is altered.

Fluid amplifiers of the character described also have been used in automatic shut-off nozzles as disclosed in U.S. Pat. No. Re. 29,715 wherein a nozzles is shown particularly useful in an application such as self-service gasoline retail outlets.

Most of the fluid amplifiers described above have been used in types of applications where liquid level control systems require a flow of liquid to provide operating power. In some applications this liquid is supplied from a recirculation system, such as a swimming pool filter pump. In other cases, the fluid amplifier is supplied with liquid when a refill valve is opened manually or by a separate control. The fluid amplifier then is used to shut the refill valve off at some predetermined level. This type of control is called high level cut-off with manual rest.

Some applications require a level control system that has automatic reset when the level falls below the shut-off point. For these types of applications, mechanical floats or electronic probes are generally used to turn the system on. However, with the development of a self-diverting amplifier as shown in my application Ser. No. 491,521 and a "dual-jet" amplifier as shown in my application Ser. No. 614,550, it has been found possible to use a fluid amplifier to turn a system on from a complete power-off condition. This is possible because these amplifiers can store potential energy, in the form of a hydrostatic pressure signal when they shut off. When the liquid level drops below the amplifier outlet and this pressure signal is released, it can be used to actuate a pressure switch or diaphragm control valve. The present invention is directed to providing such a novel system.

In other words, a drawback of prior systems utilizing fluidic principles described above is that the systems must operate with "on power". The present invention can operate from a power-off condition.

SUMMARY OF THE INVENTION

An object, therefore, of the present invention is to provide a new and improved liquid level control system for controlling the flow of liquid into a reservoir, storage tank or other container.

This and other objects of the invention are carried out by providing a fluid amplifier in combination with a fluid pressure responsive switch which is operatively associated with valve means for controlling the flow of liquid into the reservoir, storage tank or other container.

In one form of the invention exemplified herein, nozzle means is provided for developing a liquid flow stream therethrough, and valve means is provided in the liquid flow stream for opening and closing the nozzle. Fluid amplifier means is associated with the nozzle and includes a fluid power stream, signal developing means for receiving a fluid pressure signal from the power stream, and sensing means for diverting the power stream from the signal developing means in response to the static presence of the interface at a predetermined sensing level of liquid in the reservoir. Pressure responsive switch means is coupled to the valve means and is located below the signal developing means of the fluid amplifier. Conduit means in the form of a pressure signal tube communicates between the signal developing means and the pressure responsive switch means to create a hydrostatic pressure head above the switch means to maintain the switch means and, therefore, the valve means in a first condition when the fluid power stream delivers a fluid pressure signal to the signal developing means. A second condition is created when the fluid power stream is diverted from the signal developing means.

The pressure responsive switch means is maintained in an "on" condition to open the valve means when the hydrostatic pressure signal head is created above the switch means. The nozzle is air impervious except for outlet means having its terminus located at the predetermined level. Therefore, the static presence of the liquid level at the terminus of the nozzle creates a pressure imbalance in the nozzle to counteract the fluid pressure head and to turn the pressure responsive switch to an "off" condition. In this form of the invention, the pressure responsive switch means normally is located at or above the level of the terminus of the outlet means of the nozzle.

In another form of the invention, the pressure responsive switch means is located substantially at the same level as or below the terminus of the outlet means of the nozzle. The pressure responsive switch means in this form comprises a pressure differential switch. One side of the switch is associated with the hydrostatic pressure head and the other side of the switch communicates with the reservoir.

In a further form of the invention, the fluid amplifier includes an access region to the fluid power stream. Remote conduit means communicates with the access region and has a remote sensing port located at the predetermined level. The remote conduit means has a U-shaped terminal end with the sensing port located above the base of the U-shape. The nozzle has an open-ended terminus located below the base of the U-shaped terminal end of the conduit means. This permits the system to operate with "on" and "off" actuation points at different levels by using the U-shaped sensing conduit on the fluid amplifier.

Other objects, features and advantages of the invention will be apparent from the following detailed description taken in connection with the accompanying drawings.

DESCRIPTION OF THE DRAWINGS

The features of this invention which are believed to be novel are set forth with particularly in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
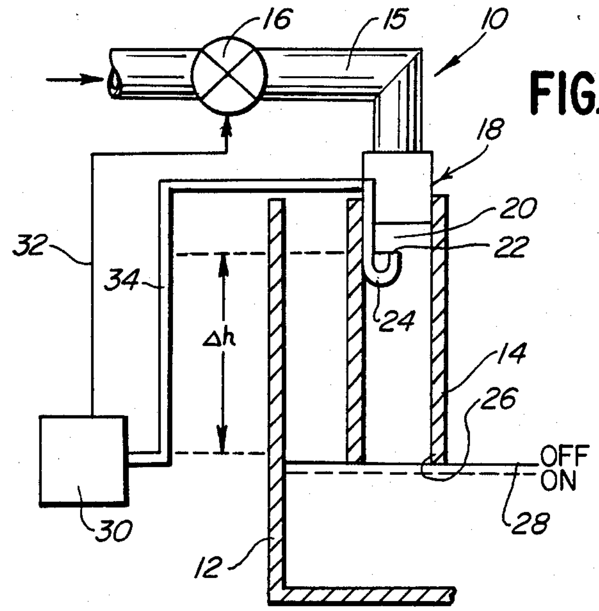
FIG. 1 is a somewhat schematic view of one form of fluidic level control system embodying the concepts of the present invention.

Referring to the drawings in greater detail, and first to the form of the invention shown in FIG. 1, a liquid level control system, generally designated 10, is illustrated for controlling the flow of liquid into a reservoir, storage tank or other container 12. A nozzle 14 is provided for developing a liquid flow stream therethrough from a supply line 15. Valve means 16 is provided in supply line 15 upstream of nozzle 14 for effectively opening and closing the nozzle.

Fluid amplifier means, generally designated 18, is associated with the inlet to nozzle 14 and includes a fluid power stream 20. Fluid amplifier 18 can be of a self-diverting amplifier means as disclosed in my copending patent application Ser. No. 491,521, or a "dual-jet" amplifier means as disclosed in my copending patent application Ser. No. 614,550. Both of those applications are incorporated herein by reference for showing the details of the fluid amplifier means. Suffice it to say, signal developing means is provided in the form of a port 22 at the distal end of an elbow-shaped conduit 24. The signal port is disposed in the fluid power stream for receiving a fluid pressure signal therefrom.

Nozzle 14 is air impervious except for an outlet port 26 at the terminus of the nozzle. The outlet port is located at a predetermined sensing level 28 of liquid in reservoir 12 and defines the "off" condition of the system. When liquid rises to outlet port 26 at the terminus of nozzle 14, a pressure imbalance is created in the nozzle for diverting fluid power stream 20 from signal developing port 22 in response to the static presence of the interface of the liquid level at the nozzle terminus.

A pressure responsive switch means 30 is coupled, as at 32 to valve means 16 to open and close the valve. Pressure responsive switch means 30 is located below signal developing port 22 of fluid amplifier 18 and is connected to the elbow-shaped tube by means of conduit means in the form of a pressure signal tube 34. The pressure signal tube creates a hydrostatic pressure head ($\Delta h$) above pressure switch 30. In essence, the pressure switch and, therefore, valve means 16 is maintained in a first condition when fluid power stream 20 delivers a fluid pressure signal to signal developing port 22 and a second condition when the fluid power stream is diverted from the signal developing port.

In operation, pressure signal tube 34 is filled with liquid to create a hydrostatic pressure head above pressure responsive switch 30. This condition is maintained as long as air is admitted to nozzle 14 through its open terminus 26 and fluid power stream 20 continues to deliver a fluid pressure signal to signal developing port 22. When valve 16 has filled container 12 to the shut-off level 28 defined by terminus 26 of nozzle 14, a pressure imbalance is created in the nozzle and fluid power stream 20 will be diverted from signal developing port 22. At this point the pressure acting on pressure switch 30 is zero because the column of liquid which creates the hydrostatic pressure head in signal tube 34 is balanced by the negative pressure in amplifier nozzle 14 which now is covered by liquid in tank 12. When the liquid level falls so that air again can enter the terminus 26 of nozzle 14, the pressure balance is destroyed and a sudden pressure signal equal to $\Delta h$ of liquid is applied to the pressure switch to again turn valve 16 on to supply liquid through the fluid amplifier and nozzle 14 to the container.

Figure 2:
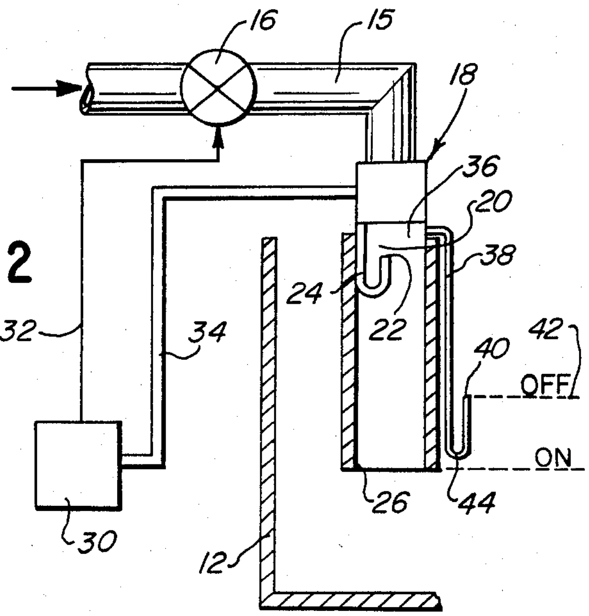
FIG. 2 is a somewhat schematic view of another form of the invention.

The system described above in relation to FIG. 1 is a single point level control system. In some applications it is desirable to have the on-off actuation points at different levels. Therefore, the form of the invention shown in FIG. 2 is designed to achieve this end. Like numerals have been applied in FIG. 2 for like components as described in relation to the system of FIG. 1. More particularly, fluid amplifier 18 is provided with an access region 36 to fluid power stream 22. A remote conduit 38, in the form of an open-ended tube, is provided in communication with access region 36 and has a remote sensing port 40 at a distal end thereof. The remote sensing port defines the predetermined level 42 of liquid in container 12 at which the system is to turn "off". Remote tube 38 has a U-shaped terminal end with a base 44 of the U-shape located below sensing port 40 and above terminus 26 of nozzle 14.

The system of FIG. 2 operates on the same basic principles as that disclosed in relation to FIG. 1, namely the effective use of a hydrostatic pressure head in signal tube 32 and the diversion of fluid power stream 22 away from signal developing port 22, responsive to the presence or absence of air in nozzle 14. Air cannot enter nozzle 22 until the liquid level has dropped to a point just below base 44 of the U-shaped portion of conduit 38. The fluid amplifier will not shut off until the level of liquid has risen to sensing port 40 at the top of the U-shaped portion of the conduit.

More particularly, when the system is "on", negative pressure in nozzle 14 aspirates liquid out of conduit 38. Air enters the nozzle through the conduit, at access region 36. Fluid power stream 22 continues to direct a signal to port 22 and pressure switch 30, as the hydrostatic pressure head in signal tube 34 is maintained. When the liquid in container 12 rises and enters sensing port 40 of remote conduit 38, air no longer is admitted to the nozzle and fluid power stream 22 is diverted to shut the system off, as described in relation to FIG. 1. As the liquid falls in container 12, either the terminus 26 of nozzle 14 will open to air to turn the system "on", or liquid falling from within the nozzle will aspirate liquid from conduit 38 and admit air to the nozzle. This depends upon the length of nozzle 14 in relation to the positioning and length of remote conduit 38.

Figure 3:
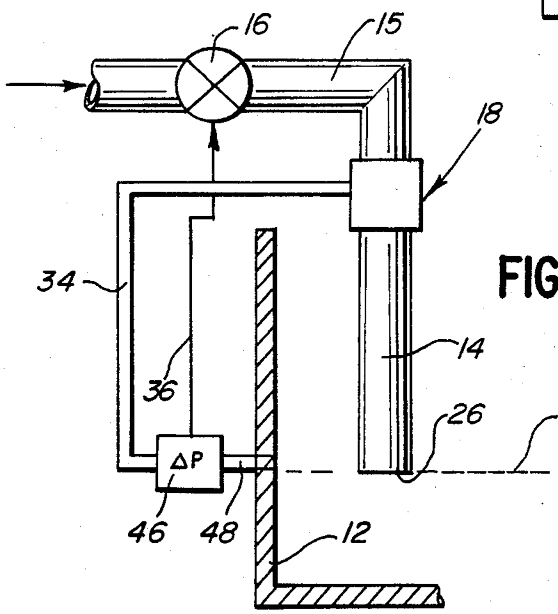
FIG. 3 is a somewhat schematic view of a further form of the invention.

Problems also have been encountered in certain liquid level control systems where a supply valve, such as valve means 16, develops a leak. A leak in a supply valve would cause the liquid level in container 12 to rise to a point, Δh higher, which would cause the system to turn on and overfill. FIG. 3 shows a system which solves this problem by utilizing a pressure differential switch 46. One side of the switch is associated with the hydrostatic pressure head in pressure signal tube 34, as described above. The other side of the switch is referenced to the tank level by means of a conduit or tube 48. Therefore, if the liquid level in container 12 rises, equal pressures are maintained across the differential pressure switch and the system will not actuate. Actuation will occur only upon a drop in the liquid level below terminus 26 of nozzle 14 (i.e. FIG. 1), or below the base 44 of remote sensing tube 38 (i.e. FIG. 2). This is accomplished by the use of a differential on-off system as afforded by differential pressure switch 46.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A liquid level control system for controlling the flow of liquid into a reservoir, storage tank or other container, comprising:

nozzle means for developing a liquid flow stream therethrough, valve means in said liquid flow stream for opening and closing the nozzle;

fluid amplifier means associated with said nozzle and including a fluid power stream, signal developing means for receiving a fluid pressure signal from said fluid power stream, and sensing means for diverting said fluid power stream from said signal developing means in response to the static presence of the interface at a predetermined sensing level of liquid in said reservoir;

pressure responsive switch means coupled to said valve means and located at a level below the signal developing means of said fluid amplifier means and at a depth equal to a hydrostatic pressure head sufficient to operate the switch means; and conduit means communicating between said signal developing means and said pressure responsive switch means to create said hydrostatic pressure head within the conduit means corresponding to a height of approximately the distance between the switch means and the signal developing means above the switch means to maintain the switch means and, therefore, the valve means in a first condition when said fluid power stream delivers a fluid pressure signal to said signal developing means and a second condition when the fluid power stream is diverted from the signal developing means.

2. The liquid level control system of claim 1 wherein said pressure responsive switch means is maintained in an "on" condition to open the valve means when said hydrostatic pressure head is created above the switch means.

3. The liquid level control system of claim 2 wherein said nozzle is air impervious except for outlet means having its terminus located at said predetermined level whereby the static presence of the liquid level at said terminus creates a pressure imbalance in the nozzle to counteract said fluid pressure head and to turn the pressure response switch means to an "off" condition.

4. The liquid level control system of claim 3 wherein said pressure responsive switch means is located above the level of the terminus of the outlet means of said nozzle.

5. The liquid level control system of claim 3 wherein said pressure responsive switch means is located substantially at the same level as or below the terminus of the outlet means of said nozzle and comprises a differential pressure switch, one side of the switch being associated with said hydrostatic pressure head and the other side of the switch communicating with the reservoir at or below said predetermined liquid level therein.

6. The liquid level control system of claim 1 wherein said fluid amplifier includes an access region to said fluid power stream, and remote conduit means communicating with said access region and having a remote sensing port located at said predetermined level.

7. The liquid level control system of claim 6 wherein said remote conduit means has a U-shaped terminal end with said sensing port located above the base of the U-shape.

8. The liquid level control system of claim 7 wherein said nozzle has an open-ended terminus located below the base of the U-shaped terminal end of said remote conduit means.

9. The liquid level control system of claim 7 wherein said remote conduit means comprises an open-ended tube.

10. A liquid level control system for controlling the flow of liquid into a reservoir, storage tank or other container, comprising:

a valve operatively associated with, and for controlling the flow of a liquid stream through, a nozzle;

a fluid amplifier associated with said nozzle and including a fluid power stream, a signal developing port for receiving a fluid pressure signal from said fluid power stream, and sensing means for diverting said fluid power stream from said signal developing port in response to the static presence of the interface at a predetermined sensing level of liquid in said reservoir;

a pressure responsive switch means coupled to said valve and located at a level below the signal developing port of the fluid amplifier and at a depth equal to a hydrostatic pressure head sufficient to operate the switch means; and a pressure signal tube communicating between said signal developing port and said pressure responsive switch means to create said hydrostatic pressure head within the signal tube corresponding to a height of approximately the distance between the switch means and the signal developing port above the switch means to maintain the switch means and, therefore, the valve in an "on" condition to open the valve when said fluid power stream delivers a fluid pressure signal to said signal developing port, the switch means changing the valve to an "off" condition when the fluid power stream is diverted from said signal developing port.

11. The liquid level control system of claim 10 wherein said fluid amplifier includes an access region to said fluid power stream, and remote conduit means communicating with said access region and having a remote sensing port located at said predetermined level.

12. The liquid level control system of claim 11 wherein said remote conduit means has a U-shaped terminal end with said sensing port located above the base of the U-shape.

13. The level control system of claim 12 wherein said nozzle has an open-ended terminus located below the base of the U-shaped terminal end of said remote conduit means.

14. The liquid level control system of claim 12 wherein said remote conduit means comprieses an open-ended tube.

15. A liquid control system for controlling the flow of liquid into a reservoir, storage tank or other container, comprising:

supply means for delivering a liquid flow stream to said container, and including valve means for turning said liquid flow steam on and off;

fluid amplifier means operatively associated with said supply means for generating a positive fluid pressure signal;

pressure responsive switch means coupled to said valve means and located at a level below the signal developing means of said fluid amplifier means and at a depth equal to a hydrostatic presure head sufficient to operate the switch means; and pressure signal conduit means communicating between said fluid amplifier means and said pressure responsive switch means to create said hydrostatic pressure head within the conduit means corresponding to a height of approximately the distance between the switch means and the fluid amplifier means above the switch means to maintain the switch means and, therefore, the valve means in a first condition in response to a fluid pressure signal from said fluid amplifier means and a second condition in response to the absence of a fluid pressure signal from said fluid amplifier means.

16. The liquid level control system of claim 15 wherein said pressure responsive switch means is maintained in an "on" condition to open the valve means when said hydrostatic pressure head is created above the switch means.

17. The liquid level control system of claim 15 wherein said pressure responsive switch means comprises a differential pressure switch, one side of the switch being associated with said hydrostatic pressure head and the other side of the switch communicating with the reservoir at or below said predetermined liquid level therein.

18. The liquid level control system of claim 15 wherein said fluid amplifier includes an access region to said fluid power stream, and remote conduit means communicating with said access region and having a remote sensing port located at said predetermined level.

19. The liquid level control system of claim 18 wherein said remote conduit means has a U-shaped terminal end with said sensing port located above the base of the U-shape.

20. The liquid level control system of claim 19 wherein said remote conduit means comprises an open-ended tube.

* * * * *